(12) United States Patent
Klinger

(10) Patent No.: US 7,685,526 B2
(45) Date of Patent: Mar. 23, 2010

(54) PROVIDING NAVIGATION IN A BROWSER

(75) Inventor: Uwe Klinger, Bad Schoenborn (DE)

(73) Assignee: SAP Aktiengesellschaft, Walldorf (DE)

( * ) Notice: Subject to any disclaimer, the term of this patent is extended or adjusted under 35 U.S.C. 154(b) by 923 days.

(21) Appl. No.: 10/723,535

(22) Filed: Nov. 26, 2003

(65) Prior Publication Data
US 2005/0114782 A1 May 26, 2005

(51) Int. Cl.
*G06F 3/00* (2006.01)
(52) U.S. Cl. .................. 715/760; 715/764; 715/768
(58) Field of Classification Search ................ 715/748, 715/749, 760, 764, 768
See application file for complete search history.

(56) References Cited

U.S. PATENT DOCUMENTS

| | | | |
|---|---|---|---|
| 6,011,537 A * | 1/2000 | Slotznick .................... | 715/733 |
| 7,003,695 B2 * | 2/2006 | Li ............................... | 714/19 |
| 7,010,581 B2 * | 3/2006 | Brown et al. ................ | 709/218 |

OTHER PUBLICATIONS

Undated screen shot of "SAPGUI" user interface from SAP AG.
http://www.4guysfromrolla.com./webtech.111500-1.shtml A Thorough Examination of 'Disabling the Back Button' by Akhilesh Reddy, , printed from the internet on Nov. 26, 2003, 5 pages.
http://www.mail-archive.com/turbine-user@jkarta..apache.org/msg13283.html, "Re: how to force a page reload on browser back button", from Peter Courcoux, printed from the internet on Nov. 26, 2003, 3 pages.
http://www.omnigroup.com/mailman/archive/webobjects-dev/2003-August/035600.html, Browser back button and link methods—caching problem: by Jonathan Rochkind, printed from the internet on Nov. 26, 2003, 3 pages.

* cited by examiner

*Primary Examiner*—Boris Pesin
(74) *Attorney, Agent, or Firm*—Fish & Richardson P.C.

(57) ABSTRACT

When a user clicks a Back button or a Forward button while reviewing an application page in a browser, the client performs an action in response which is specified by a server. The Back and Forward buttons may be controlled by the server and may be used to provide real undo and redo functionality for stateful server applications. The functionality may be implemented using invisible pages loaded in the browser. If it is determined that undo or redo cannot be performed, the client may continue to display the application page, optionally with a message to the user.

10 Claims, 4 Drawing Sheets

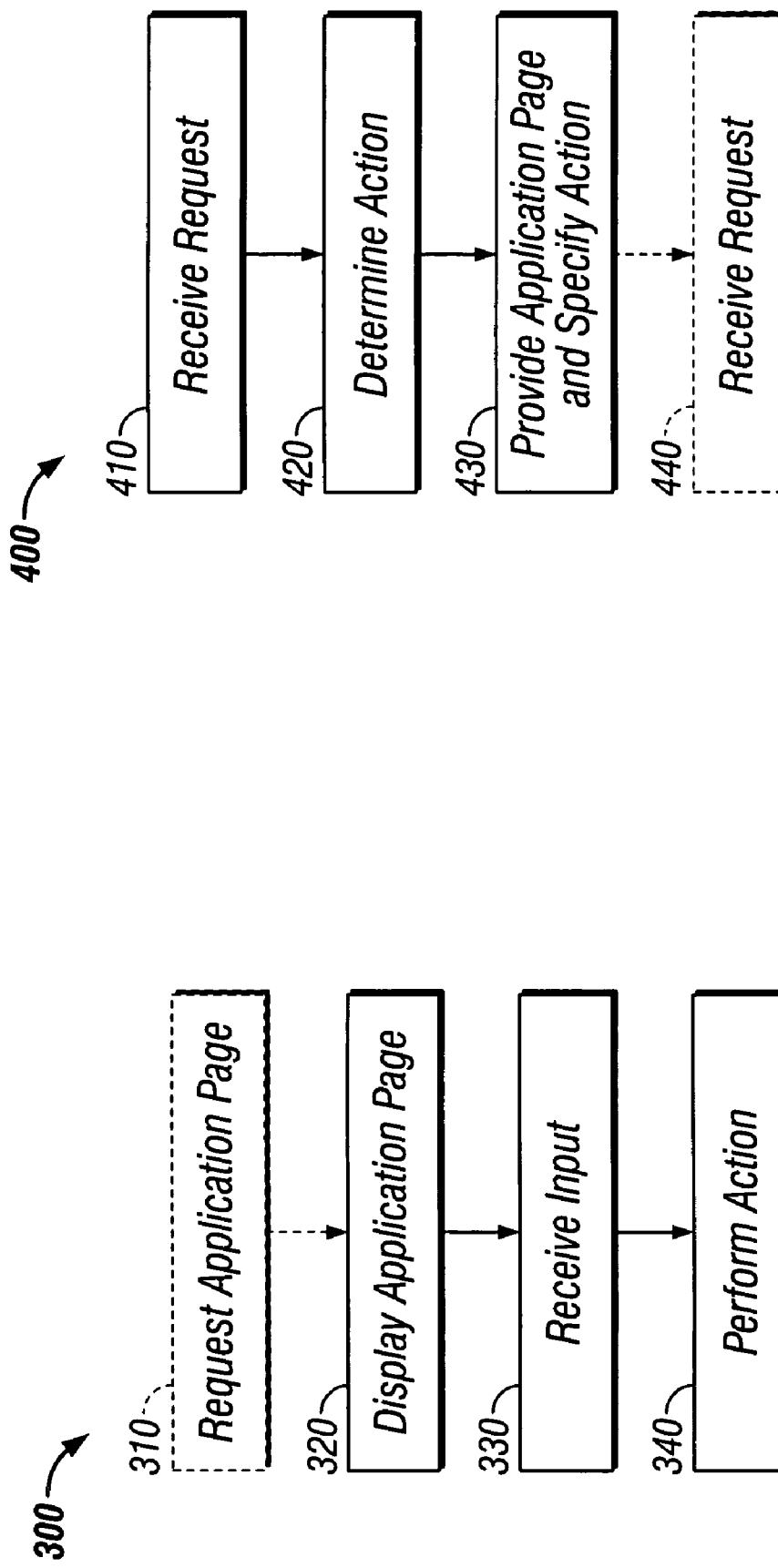

PROVIDING NAVIGATION IN A BROWSER

TECHNICAL FIELD

This description relates to providing navigation in a browser.

BACKGROUND

Conventional browsers such as Microsoft Internet Explorer and Netscape Navigator have "Back" and "Forward" buttons. The function of these buttons in different browsers is essentially the same. When a user navigates from a first page displayed in the browser to a second one, for example using a hyperlink, the browser registers the navigation in its history. If the user clicks the Back button while the second page is displayed, the browser "steps back" in its history and instead displays a cached version of the first page. At that time, the user can click the Forward button to resubmit the request for the second page. This functionality usually is sufficient for displaying pages from a stateless application in the browser. For stateful applications, in contrast, there may be problems. Some users wrongly assume that they can undo or redo changes in the application by clicking the Back and Forward buttons.

On the contrary, Back and Forward actions by the user are usually not communicated to the server at all. If the first page was obtained (from the server) using the GET command as specified in the Hypertext Transfer Protocol ("HTTP"), then the Back button click causes the browser to display the cached version of the first page without sending any request to the server. The server is therefore not "aware" that this navigation takes place in the browser. This may lead to problems. For example, some or all information on the first page may have become invalid in the meantime. This is because the browser's navigation back to the cached version of the first page does not undo any action that the server took in the process of changing from the first page to the second page. In other words, if the first page corresponds to the server application having a first state and the second page corresponds to a second state, then clicking the Back button does not change the application back to the first state.

Another HTTP command, POST, may cause similar problems. This command may not permit the use of the Back button at all. That is, although the Back button appears active in the browser, clicking it may result in an error message. Accordingly, the Back button does not accomplish what the user may have intended by clicking the Back button—to undo the last taken step. Alternatively, clicking the Back button after a POST request may prompt the browser to confirm whether the user wishes to have the original request for the first page resubmitted to the server. But because the server did not revert the application back to its previous state, the original request may now be ill-defined or nonsensical to the server. The above described problems are not limited to the Back button. Also the Forward button may lead to unexpected events, for example if it causes a previous request to the server to be resubmitted when the server application is in a different state than when the request was originally sent.

In response to problems such as these, it has been proposed that at least the Back button in the browser be deactivated. However, conventional browsers do not allow the Back button to be deactivated. Others have implemented special "Back" and "Forward" buttons in the application page(s) that may allow the user to undo or redo actions. One problem with this approach is that the browser's Back and Forward buttons remain active. Because browsers have become so widely used, users are likely to click on the browser buttons out of habit instead of on the designated buttons.

Yet another attempted approach is to prevent the browser from caching a page, thereby forcing the browser to request the page anew from the server. One disadvantage with this approach is that it only works with the GET request. Another is that it does not allow the server to control what happens on the browser when the user clicks the Back or Forward button.

SUMMARY

The invention relates to providing navigation in a browser. In a first general aspect, a method comprises displaying an application page in a browser on a client device. The application page is received from a server device and the browser has a back function and a forward function. An input that requests one of the back function and the forward function is received from a user while the application page is being displayed. An action specified by the server device is performed in response to receiving the input.

In selected embodiments, at least one invisible page is loaded in the browser. The application page is visible in the browser after the at least one invisible page is loaded. As a specific example, first, second and third invisible pages may be loaded in succession and the back function be activated after loading the third invisible page. At this stage, where the second invisible page is loaded and the application page is visible, the user may activate a Back button or a Forward button of the browser to have the first or third invisible page again loaded, respectively. Again loading any of the first and third invisible pages may trigger an action that is specified by the server device, such as an undo request or a redo request.

In a second general aspect, a method comprises receiving a request for an application page from a client device having a browser where the application page can be displayed. The browser has a back function and a forward function. It is determined an action that the client device should perform if it receives an input from a user requesting one of the back function and the forward function while the application page is being displayed. The application page is provided and the action is specified to the client device, wherein the client device performs the action if it receives the input while the application page is being displayed.

In a third general aspect, a computer system comprises a client device that includes a browser having a back function and a forward function and a server device that can communicate with the client device. An application is capable of being executed on the server device, there being at least a first application page relating to the application that can be provided to the client device for display in the browser. The computer system comprises a navigation module on the server device. The navigation module determines an action that the client device should perform if the client device receives an input from a user requesting one of the back function and the forward function while the application page is being displayed.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 3A and B are flow charts of embodiments of methods of providing navigation in a browser.

Like reference numbers in the various drawings indicate like elements.

DETAILED DESCRIPTION

FIGS. 1A-D show a browser 100 at different times (T0, T1, T2 and T3) during navigation. The browser 100 may receive pages for display from a server device. The browser 100 has a back function that a user can request with Back button 102 and a forward function that the user can request with Forward button 104. It is described below that it is the server device, not the browser, that determines what happens if the user clicks on the Back or Forward button.

At the time T0, the browser displays a first application page 106A. The first application page 106A includes data 108 and input control(s) 110. The browser 100 lets the user interact with an application on the server device by reviewing data 108 and by activating input control(s) 110. Something that the user does on the first application page 106A may trigger a navigation to another page. That is, the user's action may cause the browser 100 to request a new page from the server device, and the server device may respond to the request by providing the new page.

Figure 1A:
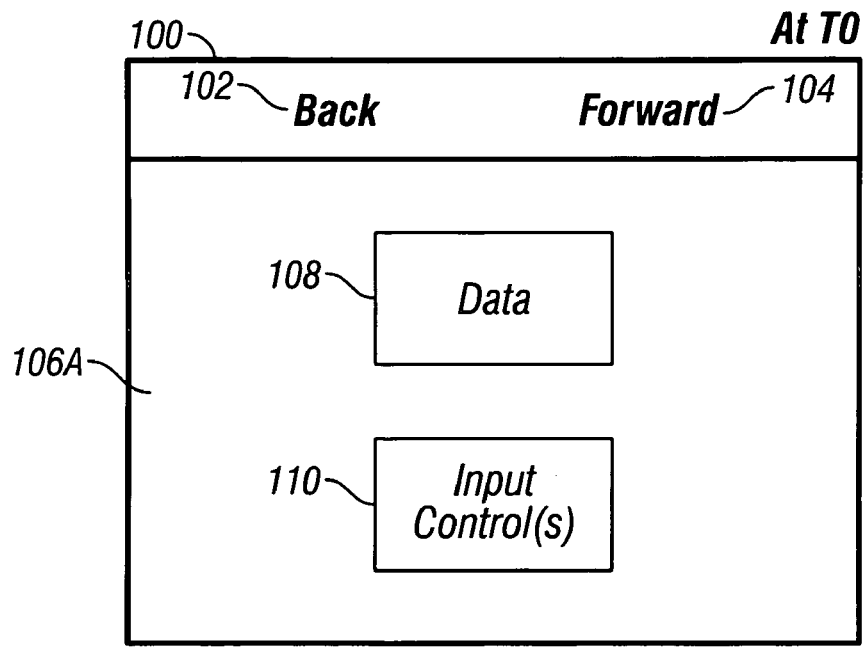
FIGS. 1A-D schematically show an embodiment of providing navigation in a browser.
Figure 1B:
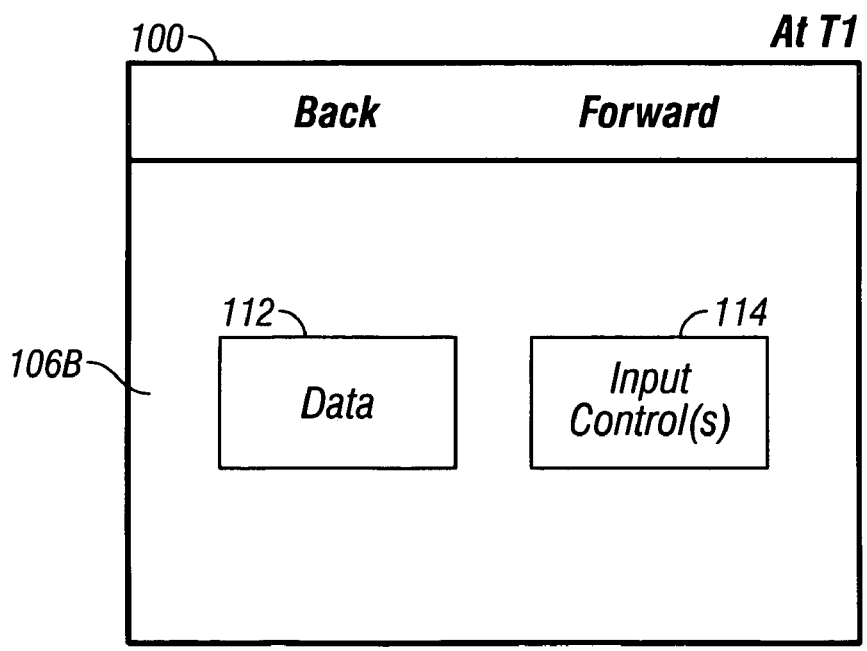

FIG. 1B shows the browser 100 displaying a second application page 106B at the time T1. The second application page 106B may include data 112 and input control(s) 114, which distinguish it from the first application page 106A (the relative locations of data and input control(s) are different to symbolize the difference in the application pages). As will be described later, navigating to the second application page 106B may correspond to a change between states of the application on the server device. The browser 100 may register the change from the page 106A to the page 106B in its navigation history. The user may interact with the application through the second application page 106B.

Figure 1C:
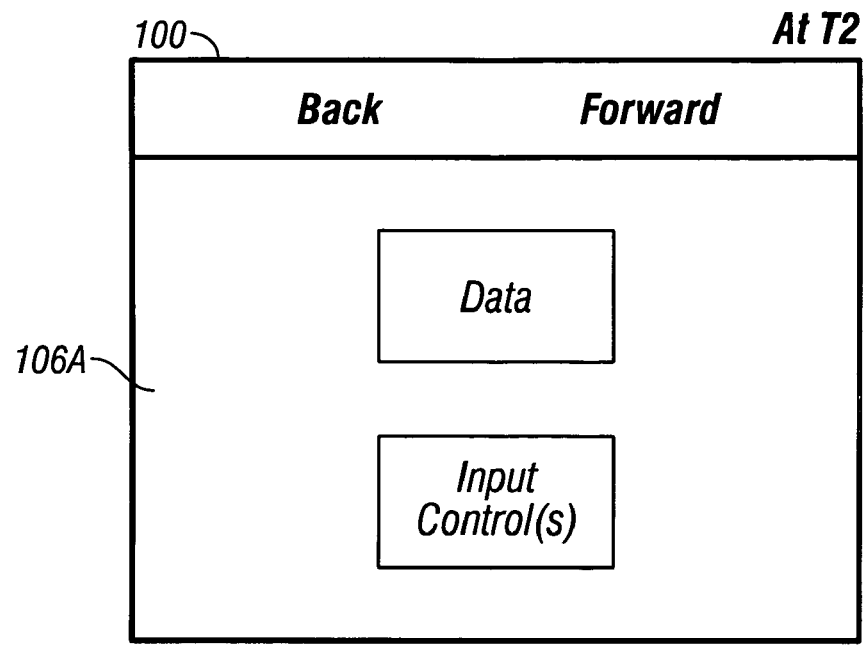

If the user clicks the Back button 102 at time T1, the browser 100 does not revert to a cached version of the first application page 106A. Rather, the server device may undo the measure taken at time T0 (if it can be undone) and may reset the application to its previous state. The server device may then provide the first application page 106A for display in the browser 100 at time T2 as shown in FIG. 1C. Thus, the Back button 102 may provide a real undo function. If the measure cannot be undone, the browser may continue displaying the second application page 106B which corresponds to the current state of the application. When it is not possible to undo, a message announcing the same may be displayed in browser 100.

Figure 1D:
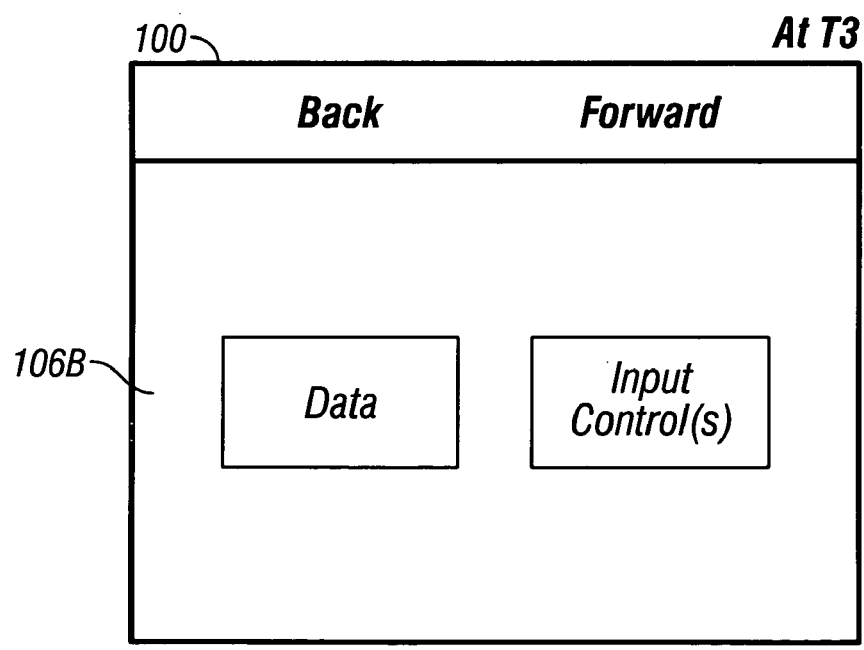

When the first application page 106A is being displayed at time T2, the user may wish to redo the measure that was undone. The user may click on the Forward button 104 to request the forward function. This does not, however, cause a mere resubmission of the previous request that prompted the server device to provide the second application page 106B. Nor does it trigger a display of a cached version of the second application page 106B. Rather, if the measure that was just undone can be redone, a redo request will be sent to the server device. The server device, in turn, may respond by redoing the undone measure and providing the second application page 106B for display in the browser at time T3 as shown in FIG. 1D. Thus, the Forward button may provide a real redo function. If the undone measure cannot be redone, the browser may continue displaying the first application page 106A which corresponds to the current state of the application. Optionally, a message announcing this may be displayed to the user. It is typically possible to disable the Forward button, and this can be done if a redo is not possible.

Figure 2:
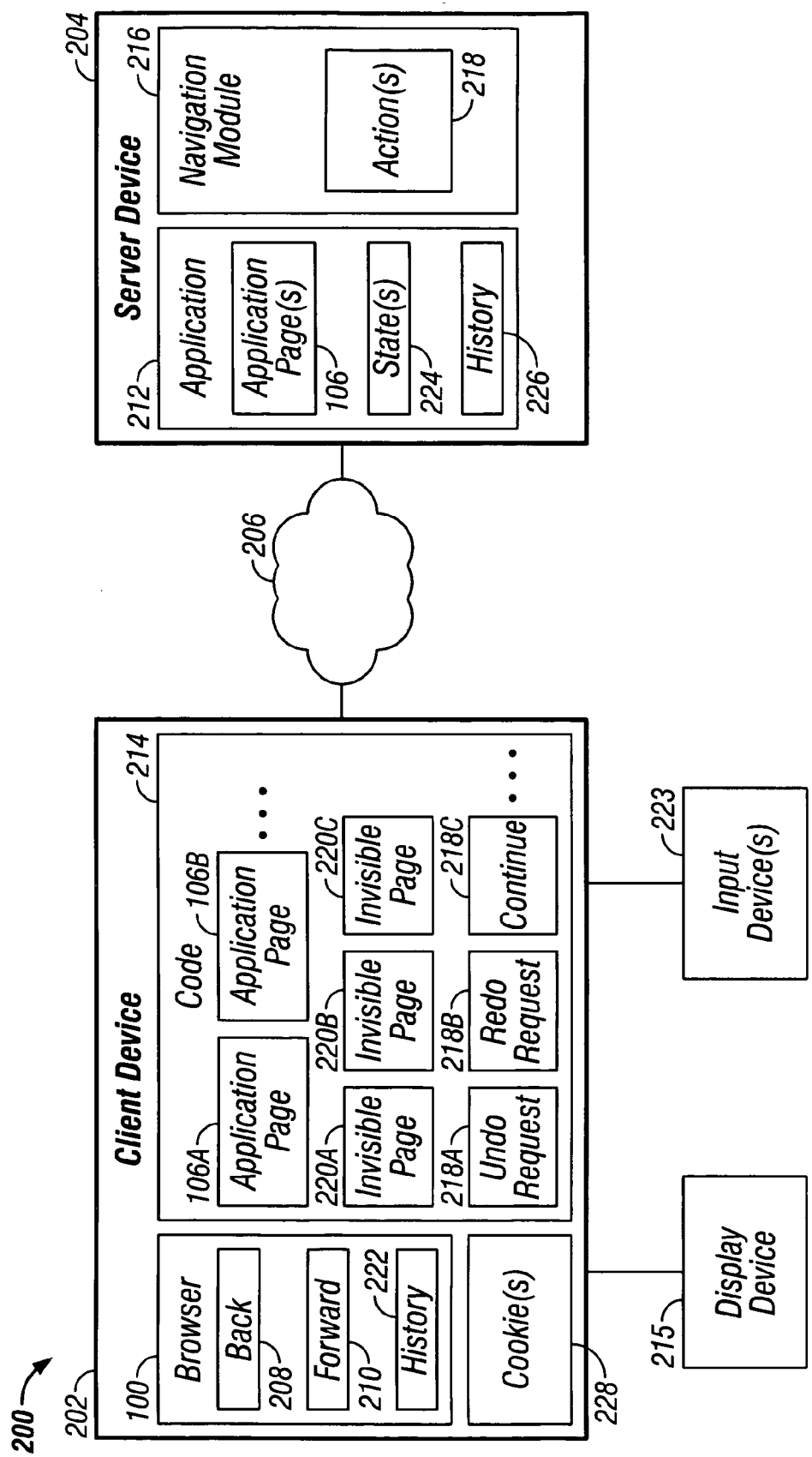
FIG. 2 schematically shows a computer system that can provide the navigation shown in FIGS. 1A-D.

An embodiment of a computer system that provides the above described navigation will now be described with reference also to FIG. 2. The browser 100 resides on a client device 202. A server device 204 can communicate with the client device 202 through a network 206. The browser 100 includes a back function 208 and a forward function 210.

An application 212 on the server device 204 provides application page(s) 106 (collectively referring to any of application pages 106A, 106B, . . . ) to the client device 202. The server device 204 provides code 214 that can be executed on the client device 202. The code 214 may include instructions for displaying one or more of application pages 106A, 106B, . . . , as shown. As an example, the server device 204 may provide the code 214 in response to a request sent by the client device 202. For purposes of explanation, FIG. 1 shows both application pages 106A and 106B in code 214. Preferably, the server device 204 sends one of the application page(s) 106 to the client device 202 at a time. The client device displays the application page(s) 106 as specified by the code 214. Any application page may be displayed on a display device 215 operably connected to the client device 202.

The server device 204 includes a navigation module 216 that determines action(s) 218. The action(s) 218 is what the client device 202 should do if the user activates the Back button 102 or the Forward button 104 while the client device 202 displays application(s) page 106. In other words, it is the server device 204, not the browser 100, that specifies what the client device should then do.

The navigation module 216 may determine the action(s) 218 by querying the application 212 or any other unit on the server device 204. For example, the navigation module 216 may ask the application 212 whether a measure can later be undone. Or the navigation module 216 may ask the application 212 whether a measure can later be redone. If the application 212 is being executed in the context of a portal on the server device 204, the navigation module 216 may query the portal regarding the possibility of undoing and redoing performed measures, to name a few examples.

The server device 204 may specify the action(s) 218 to the client device 202 by providing them in code 214 that the client device 202 can execute. That is, when the client device receives an input requesting one of the back function 208 and the forward function 210, the code 214 instructs the client device 202 which action(s) 218 to perform. For purposes of explanation, FIG. 1 shows actions 218A, 218B, 218C, . . . , in the code 214. Preferably, the server device 204 sends to the client device 202 only the action(s) that are relevant for the one application page 106 that is currently being displayed.

The following example relates to an implementation where the operation of the Back button 102 is specified by the server device 204. That is, in such an example the navigation module 216 determines what action(s) 218 the client device 202 should perform if it receives an input from the user requesting the back function 208. The server device 204 then specifies the action(s) 218 to the client device 202.

The client device 202 receives the application page 106A and displays it in the browser 100. The code 214 instructs the client device to then load at least one invisible page in the browser, beginning with a first invisible page 220A. The page 220A is referred to as invisible because the user cannot see it; rather, the user can see the application page 106A both before and after the first invisible page 220A is loaded in the browser 100. For example, the first invisible page 220A may comprise an invisible control frame inside the application page 106A. As another example, when the application page 106A is surrounded by a frame in code 214, the first invisible page 220A may comprise an invisible control frame within the same frame as the application page 106A. The code 214 instructs the client device 202 to make a request in the invisible control frame, which causes the first invisible control page 220A to be loaded in the browser 100.

The code 214 instructs the client device to load a second invisible page 220B in the browser. Similar to the first page 220A, the user does not notice the page 220B being loaded. The loading of page 220B is, however, recognized as a navigation by the browser, which consequently registers it in a history 222. The browser 100 uses the history 222 for example to determine what page to load when the back function 208 or the forward function 210 is activated. Accordingly, the navigation from page 220A to page 220B may cause the browser 100 to change the Back button 102 from an initial, grayed out state to an active state where the user can click on it (unless this had already been done due to an earlier navigation).

In this example, the code 214 does not instruct the client device 202 to immediately load any other page after the page 220B. Accordingly, the page 220B remains loaded in the browser 100 and the user can interact with the application page 106A which is still being displayed.

The user now activates the Back button 102 to request the back function 208. For example, input device(s) 223 such as a mouse may be used to click on the Back button 102. In response, the client device causes the first invisible page 220A to again be loaded in the browser 100 according to the history 222. When the page 220A is again loaded, the code 214 instructs the client device 202 to perform action(s) 218 specified by the server device 204. That is, if the navigation module 216 determined that it should be possible to undo the measure that was taken in providing the application page 106A, the server device 204 would specify an undo action to the client device 202. For example, the server device 204 may provide an undo request 218A that the client device 202 can make in such a situation.

The server device 204 receives the undo request 218A. The application 212 is stateful, meaning that it retains a state 224 on the server device between communications with the client device 202. Undoing a measure may then involve changing the application 212 from a first state to a second state of the states 224. In some implementations, there is a history 226 on the server device 204 that tracks navigation in the application 212 (and optionally in one or more additional applications). The taken measure was entered in the history 226 when it was performed. Upon undoing it, the server device 204 may omit the undone measure from the history 226.

If the navigation module 216 had determined that it was not possible to undo the taken measure, the undo request 218A would not have been provided to the client device 202. Rather, the server device may provide a continue instruction 218C which causes the client device 202 to continue displaying the application page 106A after the user clicks the Back button 102. Optionally, the continue instruction 218C includes a message that can be displayed to the user to announce that it is not possible to undo.

The client device 202 may store cookie(s) 228 to know whether the page 220A is being loaded as a result of the user clicking the Back button 102. That is, the presence or absence of certain information in cookie(s) 228 may help the client device determine whether not to perform action(s) 218 (when the page 220A is initially loaded) or whether to perform action(s) 218 (when the page 220A is loaded by the back function 208).

After the server device 204 undoes the taken measure in response to receiving the undo request 218A, it may provide an application page 106B to the client device 202. The client device 202 displays the page 106B in the browser 100. The application page 106B corresponds to the taken measure being undone, that is, it may be identical to a page that the client device 202 displayed before page 106A. The user can interact with the application 212 through page 106B. Accordingly, the undo request 218A may be equivalent to a request for an application page 106 to be provided from the server device 204.

The following example relates to an implementation where the operation of the Forward button 104 is specified by the server device 204. That is, in such an example the navigation module 216 determines what action(s) 218 the client device 202 should perform if it receives an input from the user requesting the forward function 210. The server device 204 then specifies the action(s) 218 to the client device 202.

Similar to the previous example, the code 214 instructs the client device 202 to display the application page 106A and to load first invisible page 220A, then invisible page 220B in the browser 100. The code instructs the client device 202 to then return from page 220B to page 220A almost immediately upon loading page 220B. For example, the code 214 may specify that the back function 208 be activated after loading the page 220B.

As a result, the page 220A is again loaded in the browser 100. This navigation is registered in the history 222 and, accordingly, the browser 100 changes the Forward button 104 from a grayed out state to an active state where it can be clicked. In this example, the code 214 does not instruct the client device 202 to immediately load any other page after the page 220A is again loaded. Accordingly, the page 220A remains loaded in the browser 100 and the user can interact with the application page 106A which is still being displayed.

The user now clicks the Forward button 104. In response, the client device again loads the page 220B in the browser 100. The code 214 will include a redo request 218B if the navigation module 216 determined that it was possible to redo the undoing of a previous action (the previous measure may have been undone using an application specific function or using a Back button with real undo functionality such as described in the previous example.) Again loading the page 220B triggers the client device to send the redo request 218B. The client device 202 may store cookie(s) 228 to know whether the page 220B is being loaded as a result of the user clicking the Forward button 104.

The server device 204 receives the redo request 218B and redoes the undone measure. Redoing a measure may involve changing the application from a first state to a second state. After redoing the undone measure, the server may provide application page 106B for display by the client device 202. Accordingly, the redo request 218B may be equivalent to a request for the server device 204 to provide an application page 106 to the client device 202.

Had the navigation module 216 determined that it was not possible to redo the undone measure, the server device 204 would not have specified the redo request 218B and may have specified a continue instruction 218C that causes the client device 202 to continue displaying the application page 106A, optionally with a message to the user that it is not possible to redo.

A final example will describe an implementation where the operation of both the Back button 102 and the Forward button 104 is specified by the server device 204. That is, in such an example the navigation module 216 determines what action(s) 218 the client device 202 should perform if it receives an input from the user requesting one of the back function 208 and the forward function 210. The server device 204 specifies the action(s) 218 to the client device 202.

Similarly to the previous examples, the code 214 instructs the client device 202 to display the application page 106A and to load first invisible page-220A, then invisible page 220B in the browser 100. The code 214 instructs the client device 202 to then load a third invisible page 220C in the browser 100 almost immediately after loading page 220B. This navigation is registered in history 222. The code 214 instructs the client device to then return from page 220C to page 220B almost immediately after loading page 220C. For example, the code 214 may specify that the back function 208 be activated after loading the page 220C. As a result, the page 220B is again loaded in the browser 100. In this example, the code 214 does not instruct the client device 202 to immediately load any other page after the page 220B is again loaded. Accordingly, the page 220B remains loaded in the browser 100 and the user can interact with the application page 106A which is still being displayed. The above described loadings cause both the Back button 102 and the Forward button 104 to be active in the browser 100.

Suppose now, as a first scenario, that the user clicks the Back button 102. The client device will again load page 220A and, according to instructions in code 214, perform one or more action(s) 218. For example, if an undo is possible, the client device can send an undo request 218A to the server device. If an undo is not possible, the client device may continue displaying application page 106A according to continue instruction 218C.

Suppose instead, as a second scenario, that the user clicks the Forward button 104 while the page 220B is loaded. The client device will again load page 220C. The code 214 instructs the client device to perform one or more action(s) 218, such as sending the redo request 218B. If a redo is not possible, the client device may continue displaying application page 106A according to continue instruction 218C.

The cookie(s) 228 may be used to determine whether page 220A (in the first scenario) and the page 220C (in the second scenario) are being loaded due to instructions in the code 214 (which means action(s) 218 should not be performed) or due to the user clicking the Back or Forward buttons, respectively (which means action(s) 218 should be performed). The cookie(s) 228 may be used to determine whether page 220B is initially loaded (which means page 220C should follow) or is loaded due to activating the back function on page 220C (which means no further page should automatically be loaded).

The application page(s) 106 may be transmitted to the client device 202 in form of Hypertext Markup Language (HTML) code, to name just one example. As another example, portions of the code 214 that relate to loading any of invisible pages 220A, 220B or 220C or to the action(s) 218 may include instructions formulated using Javascript code. Preferably, the portions of the code 214 relating to the invisible page(s) or to the action(s) is provided to the client device together with the application page(s).

The server device 204 may be able to properly execute undo request 218A or redo request 218B even if the application 212 (or the server device itself), has been shut down and restarted since the previous measure was taken. This may be done using history 226. Also, the undoing and redoing of measures taken by the server device are only examples of the action(s) 218 that the server device 204 can specify for the client device 202. In other implementations, the action(s) 218 may involve any other action that the client device 202 can perform, and such action(s) need not involve a communication with the server device 204. For example, it may be possible to block the Back button from transmitting a request as long as the server device is executing a command.

FIGS. 3A-B are flow charts of methods 300 and 400, respectively, of providing navigation in a browser. Method 300 may be performed by a client device. For example, a computer program product can include instructions that cause a processor of the client device to execute the steps of method 300. Method 400 may be performed by a server device. For example, a computer program product can include instructions that cause a processor of the server device to execute the steps of method 400.

As shown in FIG. 3A, method 300 for providing navigation in a browser includes the following steps:

Optionally, requesting 310 an application page 106 from the server device.

Displaying 320 the application page 106.

Receiving 330 input from the user requesting one of the back function 208 and the forward function 210.

Performing 340 an action 218 that is specified by the server device.

As shown in FIG. 3B, method 400 for providing navigation in a browser includes the following steps:

Receiving 410 a request for an application page 106 from a client device.

Determining 420 an action 218 that the client device should perform if it receives an input requesting one of the back function 208 and the forward function 210.

Providing 430 the application page 106 and specifying the action 218 to the client device.

Optionally, the server device receives 440 a request from the client device. It may be the action 218 that triggered the client device to send this request. Receiving 440 the request may be the first step in again performing the method 400.

Some examples above were described with regard to loading invisible pages. Such pages have no user relevant information and are made invisible to avoid distracting or confusing the user. Non-invisible pages can be used in an analogous way.

Advantages of using the methods and systems described herein may include any or all of the following. Providing improved navigation in a browser. Providing server controlled Back and Forward buttons in a browser. Facilitating that the server can specify an action that the client should perform when the user clicks the Back or Forward button. Providing a real undo functionality in a browser. Providing a real redo functionality in a browser. Avoiding that the Back or Forward button causes an unexpected or undefined input to a stateful server application. Being able to block the Back button while a request is being executed on the server device.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing navigation in a browser, the method comprising:

displaying a first application page in a browser on a client device, the first application page received at the client device from a server device and generated using a stateful application on the server device, the first application page corresponding to the stateful application changing to a first state from a second state, wherein the first application page corresponds to the first state;

loading, on the client device and in response to displaying the first application page, a first invisible page in the browser, wherein the first invisible page is not visible to a user of the client device such that the first application page remains visible in the browser during and after loading the first invisible page;

loading, on the client device and in response to loading the first invisible page, a second invisible page in the browser, wherein the second invisible page is not visible to the user of the client device such that the first application page remains visible in the browser during and after loading the first and second invisible pages, and wherein the browser registers the loading of the second invisible page in a history as a navigation from the first invisible page to the second invisible page;

receiving an input in the client device upon the user activating a back button in a toolbar of the browser after the first and second invisible pages are loaded, the back button configured to cause the browser to return to a previous entry in the history;

loading, on the client device and in response to the input, the first invisible page again in the browser according to the navigation registered in the history, wherein the first invisible page is not visible to the user of the client device such that the first application page remains visible in the browser during and after again loading the first invisible page;

making, from the client device and in response to again loading the first invisible page, an undo request to the server device, the undo request causing the server device to change the application from the first state to the second state;

receiving a second application page on the client device, the second application page corresponding to the second state and being received from the server device in response to making the undo request; and displaying the second application page in the browser in response to receiving the input.

2. The method of claim 1, further comprising storing information in a cookie on the client device to identify that the first invisible page is again being loaded in response to the input activating the back button.

3. The method of claim 1, further comprising:

receiving another input in the client device upon the user activating a forward button in the toolbar of the browser after the second application page is displayed in the browser;

loading, on the client device and in response to the other input, the second invisible page again in the browser;

making, from the client device and in response to again loading the second invisible page, a redo request to the server device, the redo request causing the server device to change the application from the second state to the first state;

receiving the first application page on the client device from the server device in response to making the redo request; and displaying the first application page on the client device in response to the other input.

4. The method of claim 3, further comprising storing information in a cookie on the client device to identify that the second invisible page is again being loaded in response to the other input activating the forward button.

5. The method of claim 1, wherein the first application page is received from the server device in response to a request sent from the client device.

6. A computer program product tangibly embodied in a machine readable storage device and containing executable instructions that when executed cause a processor to perform operations comprising:

displaying a first application page in a browser on a client device, the first application page received at the client device from a server device and generated using a stateful application on the server device, the first application page corresponding to the stateful application changing to a first state from a second state, wherein the first application page corresponds to the first state;

loading, on the client device and in response to displaying the first application page, a first invisible page in the browser, wherein the first invisible page is not visible to a user of the client device such that the first application page remains visible in the browser during and after loading the first invisible page;

loading, on the client device and in response to loading the first invisible page, a second invisible page in the browser, wherein the second invisible page is not visible to the user of the client device such that the first application page remains visible in the browser during and after loading the first and second invisible pages, and wherein the browser registers the loading of the second invisible page in a history as a navigation from the first invisible page to the second invisible page;

receiving an input in the client device upon the user activating a back button in a toolbar of the browser after the first and second invisible pages are loaded, the back button configured to cause the browser to return to a previous entry in the history;

loading, on the client device and in response to the input, the first invisible page again in the browser according to the navigation registered in the history, wherein the first invisible page is not visible to the user of the client device such that the first application page remains visible in the browser during and after again loading the first invisible page;

making, from the client device and in response to again loading the first invisible page, an undo request to the server device, the undo request causing the server device to change the application from the first state to the second state;

receiving a second application page on the client device, the second application page corresponding to the second state and being received from the server device in response to making the undo request; and displaying the second application page in the browser in response to receiving the input.

7. The computer program product of claim 6, wherein the operations further comprise storing information in a cookie on the client device to identify that the first invisible page is again being loaded in response to the input activating the back button.

8. The computer program product of claim 6, wherein the operations further comprise:

receiving another input in the client device upon the user activating a forward button in the toolbar of the browser after the second application page is displayed in the browser;

loading, on the client device and in response to the other input, the second invisible page again in the browser;

making, from the client device and in response to again loading the second invisible page, a redo request to the server device, the redo request causing the server device to change the application from the second state to the first state;

receiving the first application page on the client device from the server device in response to making the redo request; and displaying the first application page on the client device in response to the other input.

9. The computer program product of claim 8, wherein the operations further comprise storing information in a cookie on the client device to identify that the second invisible page is again being loaded in response to the other input activating the forward button.

10. The computer program product of claim 6, wherein the first application page is received from the server device in response to a request sent from the client device.

\* \* \* \* \*